United States Patent Office 3,305,979
Patented Feb. 28, 1967

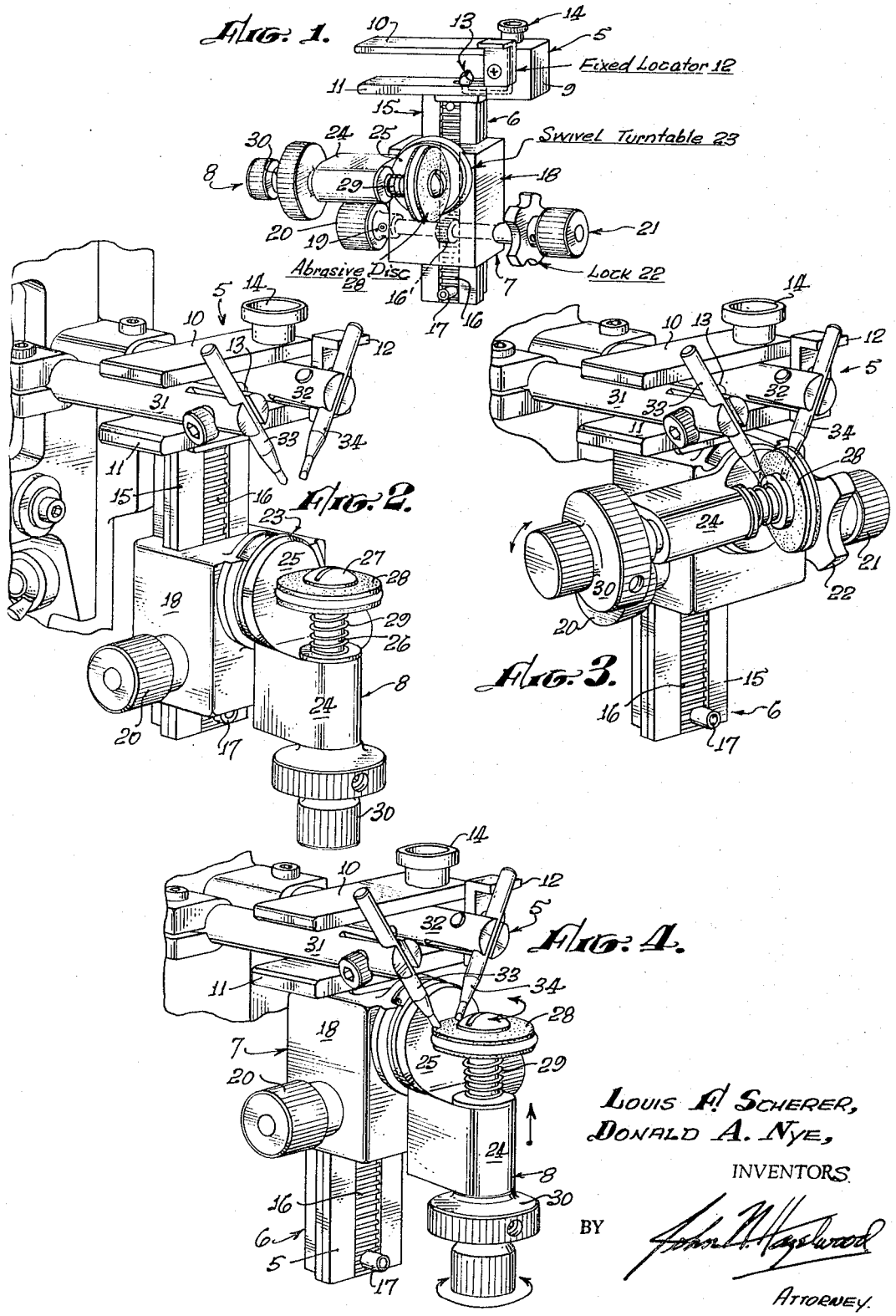

3,305,979
ELECTRODE DRESSING TOOL
Louis F. Scherer and Donald A. Nye, both of Pomona, Calif., assignors to General Dynamics Corporation, Pomona, Calif., a corporation of Delaware
Filed June 18, 1964, Ser. No. 376,004
18 Claims. (Cl. 51—241)

This invention relates to electrode dressing tools, and more particularly to an electrode dressing tool for accurately forming the surfaces of the electrodes used in precision welding such as 3–D module welding.

In welders of the type having cooperating electrodes relatively movable into and out of engagement with respect to one another and with respect to the work to be welded, the efficiency of the welds produced thereby depends to a great extent on the condition of the surfaces of the electrodes. For example, if the surfaces become corroded or uneven, the transmission of current through the work is curtailed with the result that the work will not be heated to the proper temperature for welding. Also, if the work engaging surfaces of the electrodes do not have a flat engagement with the work, the area of the weld and, consequently, the strength of the latter is reduced.

The present invention contemplates a tool for simultaneously reshaping or dressing both electrodes in a manner to insure flat engagement between the surfaces of the electrodes used in precision surface welding, such 3–D module welding, and to insure flat engagement of the work engaging surfaces of both electrodes and, at the same time, to clean or remove any corrosion from the surfaces.

Therefore, it is an object of this invention to provide an electrode dressing tool.

A further object of the invention is to provide an electrode dressing tool for precision surface welding apparatus, such as a 3–D module welding apparatus.

Another object of the invention is to provide an appratus for accurately forming the surfaces of the electrodes used in 3–D module welding.

Another object of the invention is to provide an apparatus for simultaneously dressing both electrodes in a manner to insure flat engagement.

Another object of the invention is to provide an electrode dressing apparatus for simultaneously dressing electrodes positioned at an angle with respect to each other in a manner to insure flat engagement therebetween and to insure flat end surfaces thereof.

Other objects not specifically set forth above will become readily apparent from the following description especially when considered in connection with the accompanying drawings, wherein:

FIG. 1 is a perspective view of an embodiment of the invention;

FIG. 2 is a view of the FIG. 1 device positioned on a welding apparatus;

FIG. 3 is a view of the FIG. 1 device positioned to dress the adjacent surfaces of the electrodes of a welding apparatus; and FIG. 4 is a view of the FIG. 1 device positioned to dress the lower surfaces of the electrodes of a welding apparatus.

This invention pertains to an electrode dressing attachment for accurately forming the electrode surfaces of a surface welding apparatus. More particularly, the attachment comprises a laterally extending mounting sub-assembly including a spring loaded pin and an element having a flat machined surface providing means for accurately locating the attachment, a vertically extending slide having a rack and which is attached to the mounting sub-assembly, and a carriage means adjustable on the slide by manually turning knob means which rotate a gear in mesh with the rack and which is provided with a swivel turn-table having a rotatable electrode dressing disc thereon. Adjustment of the turn-table in this embodiment is done manually as is the actuation of the dressing disc.

Referring now to the drawings, the 3–D module electrode dressing attachment consists generally of four sub-assemblies, namely; a mounting assembly 5, a slide assembly 6, a carriage assembly 7, and a dressing disc assembly 8.

Mounting assembly 5 includes a mounting bracket having a body section 9 and laterally extending arms 10 and 11. A stop plate or locator 12 is fixed to the bracket body section 9, the function thereof to be described hereinafter. A spring loaded pin 13 is positioned in the lower arm 11 of the mounting bracket, pin 13 having a flat machined surface on the right hand side, as shown in FIGS. 1 and 3, to assist in the positioning of the dressing tool. The exact distance the pin 13 is located from bracket body 9 will be determined by the dimensions of the electrode holder of the associated welding apparatus as will become readily apparent from the explanation of operation. Pin 13 is controlled by button 14 operatively mounted in bracket body 9 and connected to pin 13 in any conventional manner so that the top of pin 13 is moved downwardly toward lower arm 11 when button 14 is pressed downwardly.

Slide assembly 6 includes a slide bar 15 attached to or integral with lower arm 11 of mounting assembly 5. A gear rack 16 is inserted into the center of slide bar 15 and positioned flush with the front surface thereof. Gear rack 16 may be attached to bar 15 in any conventional manner such as by welding or by bolts or pins. A positive stop 17 is attached to gear rack 16 near the lower end thereof as shown in FIG. 1, the purpose of which will be described hereinafter.

Carriage assembly 7 includes a housing 18 so constructed as to travel upwardly or downwardly on slide bar 15 upon movement of a gear 16' which intermeshes with the rack 16 on slide bar 15. The gear 16' is positioned within housing 18 and is mounted on shaft 19 which extends through the lower portion of housing 18. Knurled knobs 20 and 21 are attached to shaft 19 by set screws or other attaching means to turn the same. A lock mechanism 22 is positioned on shaft 19 adjacent knob 21 and constructed so as to lock shaft 19 upon turning lock 22 thus preventing movement of housing 18 with respect to slide bar 15. The construction of lock mechanism 22 is conventional and a detail description thereof is deemed unnecessary. Housing 18 is provided at the upper front thereof with a flanged portion so designed to provide a platform for a swivel turntable 23 of the dressing disc assembly 8.

Dressing disc assembly 8 includes a housing 24 which in this embodiment has an extending flange-like portion 25 defining the swivel turntable 23. Turntable 23 is so constructed as to move housing 24 into three (3) different positions, namely; vertical with respect to slide bar 15 or on the left side or right side of said slide bar by means (not shown) such as detents which hold the housing in a desired position but allow movement of turntable 23 from one position to another by manual force. A shaft 26 extends through housing 24, upon one end thereof being mounted, by means such as screw 27, a double faced abrasive electrode dressing disc 28 which is spring loaded by spring 29 positioned around shaft 26. Abrasive disc 28 is shown as being of the split type spring biased type, but may be of any construction which will satisfy specific work requirements. A knurled knob 30 is mounted on shaft 26 at the opposite end from abrasive disc 28 by a set screw or the like, knob 30 functioning to rotate disc 28 upon rotation of the knob.

FIGS. 2-4 show the electrode dressing tool of the invention mounted on the electrode holders of the head of a 3-D module welding machine. The construction of the machine does not constitute part of the invention and only the elements thereof which aid in understanding the invention will be described. The welding machine includes a fixed electrode holder 32 and a movable electrode holder 31, electrode holder 31 being capable of horizontal movement toward and away from electrode holder 32. Electrodes 33 and 34 are held in holders 31 and 32, respectively, by conventional means such as set screws and at an included angle in this application of 70°. As shown in FIG. 2, each electrode 33 and 34 is provided with a flat surface with respect to the vertical and a flat surface with respect to the horizontal so that when properly dressed electrodes are brought together by holders 31 and 32 the adjacent flat surfaces of the electrodes match and the horizontal surfaces of each electrode define a continuous flat surface.

Under usual work conditions, dressing of the electrodes is required approximately every four (4) hours. Prior to this invention the only known manner of dressing this type of electrode was by hand filing wherein it is practically impossible to file the surfaces to the exact requirements. Additionally, hand filing shortened the life of the electrodes due to the excess amount taken therefrom in attempting to make the proper dressing.

As seen in FIG. 3, mounting assembly 5 is positioned on electrode holders 31 and 32 with fixed electrode holder 32 being located between the flat surfaced spring loaded pin 13 and body section 9 of the mounting bracket so as to securely hold the dressing tool in proper position. The distance between the arms 10 and 11 of the mounting bracket is so designed as to allow electrode holder 31 to move horizontally therebetween. The desired position of the mounting assembly 5 is determined by moving the mounting bracket outwardly toward the electrodes 33 and 34 until stop plate or locator 12 mounted on the body 9 of the bracket abuts against electrode 34 fixedly held by electrode holder 32. Removal of the electrode dressing tool from the welder head is accomplished by depressing button 14 which moves pin 13 downwardly away from electrode holder 32, whereby mounting assembly 5 can be removed to the right as shown.

During the above described mounting operation of the dressing tool on the welder head, the carriage assembly 7 would preferably be located toward the lower end of slide assembly 6 as shown in FIG. 2, thus eliminating contact between the electrodes and dressing disc assembly 8.

With the dressing tool mounted on the welder head in the manner shown in FIG. 2, reshaping or dressing of electrodes 33 and 34 is accomplished by swinging disc assembly 8 to the horizontal position on the left side of carriage assembly 7 as shown in FIG. 1, if the operator is using his left hand or to the horizontal position on the right side of carriage assembly 7, if the operator used his right hand to turn knob 30. As set forth above, movement of disc assembly 8 with respect to carriage assembly 7 is accomplished by the movement of swivel turntable 23 and certain of the three holding detents (not shown), there being a detent so located as to hold disc assembly 8 in the left hand, vertical, or right hand position with respect to the carriage assembly 7.

With the dressing disc assembly 8 in the desired horizontal position, shown in the left hand position, locking mechanism 22 is released and either knob 20 or 21 is rotated which in turn moves the internal carriage gear 16' on gear rack 16 so as to move carriage assembly 7 upwardly to the position shown in FIG. 3. Lock mechanism 22 is actuated to hold carriage assembly 7 in the desired location. As set forth above and as shown in FIG. 2, electrodes 33 and 34 require flat matching surfaces so that when the electrodes are brought together there is no air gap therebetween. To insure the proper dressing of the electrodes, the flat surfaces thereof need to be dressed simultaneously. Thus with the disc assembly 8 positioned between electrodes 33 and 34 with a slight pre-load against electrode 34 due to spring 29, electrode holder 31 is moved to the right to abut electrode 33 against the double faced abrasive disc 28 as shown in FIG. 3. Dressing of electrodes 33 and 34 is now accomplished by turning knob 30 which in turn rotates abrasive disc 28 against electrodes 33 and 34 simultaneously, thus properly dressing the adjacent surfaces thereof.

With the adjacent surfaces of electrodes 33 and 34 dressed, the dressing disc is removed by moving electrode holder 31 to the left, releasing lock mechanism 22 and lowering carriage assembly 7 along slide bar 15 by turning knobs 20 or 21.

To complete the electrode reshaping or dressing process, the bottom surfaces of electrodes 33 and 34 must be dressed flat with respect to the horizontal. This is accomplished by rotating disc assembly 8 on turntable 23 to the vertical position shown in FIG. 4. Again carriage assembly 7 is raised on slide bar 15 by turning knobs 20 or 21 to a position wherein abrasive disc 28 is under slight preload against the electrodes by spring 29. Carriage assembly 7 is locked in the desired location by mechanism 22. With the abrasive disc 28 positioned as shown in FIG. 4, the bottom surfaces of electrodes 33 and 34 are simultaneously dressed by turning knob 30 which rotates disc 28.

Upon completion of the dressing operation, lock mechanism 22 is released; carriage assembly 7 is lowered against stop 17 of slide assembly 6 and locked in place, if desired; button 14 on mounting assembly 5 is depressed thus releasing pin 13, whereby the electrode dressing tool can be removed from the head of the welding machine and the machine is ready for operation with properly dressed electrodes.

It has thus been shown that this invention provides a simple and efficient tool for accurately dressing electrodes and provides a large cost saving due to the comparatively short down time of the welding machine during the electrode dressing operation as compared to the prior known methods of electrode dressing.

While the invention has been described and shown as relating to 3-D module welding, it is not intended to be limited thereto, and may be utilized in any applications requiring simultaneous surfacing of adjacent elements. Additionally, the tool of this invention may be effectively used in any application requiring accurate dressing of a single element. Also, the tool may be manipulated by automatic control mechanism, if desired.

Although a particular embodiment of the invention has been illustrated and described, modifications of the disclosed apparatus will be readily apparent to those skilled in the art, and it is intended to cover in the appended claims all such modifications as come within the spirit and scope of the invention.

What we claim is:

1. A tool for reshaping or dressing the surfaces of at least one element comprising: a mounting assembly including a bracket-like means for securing said tool adjacent an associated element to be reshaped or dressed, said bracket-like means of said mounting assembly including a resiliently biased pin means and a release mechanism for said pin means, a slide assembly, a carriage assembly, and a disc assembly, said slide assembly being operatively attached to said mounting assembly, said carriage assembly being movably mounted on said slide assembly, and said disc assembly being rotatably mounted on said carriage assembly through a turntable-like means, whereby said disc assembly may be positioned vertically or horizontally with respect to an associated element to be reshaped or dressed.

2. The tool defined in claim 1 wherein said mounting assembly additionally includes a locator means for accurately positioning said tool with respect to an associated element to be reshaped thereby.

3. The tool defined in claim 1 wherein said slide assembly includes a stop means positioned at one end thereof.

4. The tool defined in claim 1 wherein said carriage assembly includes a locking mechanism for holding said carriage assembly at a desired location on said slide assembly.

5. The tool defined in claim 1 wherein said slide assembly and said carriage assembly include intermeshing rack and gear means.

6. The tool defined in claim 5 wherein said carriage assembly additionally includes means for rotating said gear means.

7. The tool defined in claim 6 wherein said carriage assembly additionally includes locking means for holding said rotating means against movement.

8. The tool defined in claim 1 wherein said disc assembly includes a resiliently mounted abrasive disc means.

9. The tool defined in claim 8 wherein said disc assembly having a frame, a rack means, and a stop means; abrasive disc means.

10. An electrode dressing tool for simultaneously dressing surfaces of adjacent electrodes comprising: a mounting assembly having bracket-like means, means positioned in said bracket-like means and adapted to restrain an associated electrode holder when mounted therein, means for retracting said restraining means, and means adapted for locating said assembly with respect to an associated electrode; a slide assembly attached to said mounting assembly having a frame, a rack means, and a stop means; a carriage assembly having a housing movably mounted on said frame of said slide assembly, means operatively associated with said rack means for moving said housing with respect to said frame, and means for locking said last named means for preventing movement of said housing; a disc assembly having a housing rotatably mounted on said carriage assembly housing, an abrasive disc means, and means mounted in said disc assembly housing for rotating said abrasive disc means.

11. The electrode dressing tool defined in claim 10 wherein said restraining means is spring biased.

12. The electrode dressing tool defined in claim 10 wherein said rack means includes a plurality of gear teeth.

13. The electrode dressing tool defined in claim 12 wherein said means for moving said carriage housing includes a gear means intermeshed with said gear teeth of said slide assembly rack means.

14. The electrode dressing tool defined in claim 10 wherein said abrasive disc means is spring biased and provided with an abrasive surface on each face thereof.

15. The electrode dressing tool defined in claim 10 wherein said carriage assembly and said disc assembly include elements of a turntable-like means upon which said disc assembly rotates with respect to said carriage assembly.

16. The electrode dressing tool defined in claim 15 wherein the abrasive disc means of said disc assembly is provided with an abrasive surface on each face thereof, and wherein said abrasive disc means is spring biased.

17. A tool for dressing electrodes mounted at a predetermined angle to one another in electrode holders of a welding machine comprising: a mounting assembly, a slide assembly, a carriage assembly, and an abrasive disc assembly; said mounting assembly including a mounting bracket adapted to be positioned on electrode holders of a welding machine, said mounting assembly including locator means, said mounting assembly additionally including a spring loaded pin means adapted to retain an electrode holder in said bracket and means for retracting said pin means; said slide assembly and said carriage assembly including means for moving said carriage assembly with respect to said slide assembly; said carriage assembly additionally including means for locking the last named means; said abrasive disc assembly including a spring loaded abrasive disc and means for rotating said disc.

18. The tool defined in claim 17 wherein said disc assembly and said carriage assembly include a turntable-like mechanism, whereby said spring loaded abrasive disc is adapted to be positioned vertically or horizontally with respect to electrodes held by electrode holders of the associated welding machine.

References Cited by the Examiner

UNITED STATES PATENTS

| | | | |
|---|---|---|---|
| 945,455 | 1/1910 | Hanson. | |
| 1,642,708 | 9/1927 | Wirrer | 51—109 X |
| 2,300,173 | 10/1942 | Platz | 51—241 |
| 2,357,038 | 8/1944 | Whitesell | 51—241 X |
| 2,503,382 | 4/1950 | Fisher | 51—241 |
| 2,700,258 | 1/1955 | White | 51—234 |
| 2,844,922 | 7/1958 | Thiel | 51—234 |

References Cited by the Applicant

UNITED STATES PATENTS

| | | |
|---|---|---|
| 2,051,309 | 8/1936 | McConnell et al. |
| 2,337,037 | 12/1943 | Fentress. |
| 2,419,817 | 4/1947 | Bruno. |
| 2,579,360 | 12/1951 | Broun. |

ROBERT C. RIORDON, *Primary Examiner.*

D. G. KELLY, *Assistant Examiner.*